US00RE42209E

(19) United States
(12) Reissued Patent
Lunsford et al.

(10) Patent Number: US RE42,209 E
(45) Date of Reissued Patent: Mar. 8, 2011

(54) PATTERNED, FLAME RESISTANT FABRICS AND METHOD FOR MAKING SAME

(75) Inventors: Clyde C. Lunsford, Sharpsburg, GA (US); Phillip H. Riggins, Greensboro, NC (US); Michael T. Stanhope, Atlanta, GA (US)

(73) Assignee: Southern Mills, Inc., Union City, GA (US)

(21) Appl. No.: 11/715,985

(22) Filed: Mar. 8, 2007

Related U.S. Patent Documents

Reissue of:
(64) Patent No.: 6,867,154
Issued: Mar. 15, 2005
Appl. No.: 09/641,830
Filed: Aug. 18, 2000

U.S. Applications:
(60) Provisional application No. 60/149,792, filed on Aug. 19, 1999.

(51) Int. Cl.
*B32B 27/04* (2006.01)

(52) U.S. Cl. ..... 442/136; 2/7; 442/164; 428/543

(58) Field of Classification Search ..... None
See application file for complete search history.

(56) References Cited

U.S. PATENT DOCUMENTS

| | | | | |
|---|---|---|---|---|
| 3,918,901 | A | | 11/1975 | Ida et al. |
| 4,668,234 | A | | 5/1987 | Vance et al. |
| 4,705,523 | A | | 11/1987 | Hussamy |
| 4,705,527 | A | | 11/1987 | Hussamy |
| 4,741,740 | A | | 5/1988 | Davis et al. |
| 4,752,300 | A | | 6/1988 | Johnson |
| 4,759,770 | A | | 7/1988 | Cates et al. |
| 4,814,222 | A | | 3/1989 | Davis et al. |
| 4,868,041 | A | | 9/1989 | Yamagishi et al. |
| 4,898,596 | A | | 2/1990 | Riggins et al. |
| 4,902,300 | A | | 2/1990 | Johnson et al. |
| 4,981,488 | A | | 1/1991 | Cates et al. |
| 4,996,099 | A | | 2/1991 | Cooke et al. |
| 5,074,889 | A | | 12/1991 | Hodge et al. |
| 5,174,790 | A | | 12/1992 | Riggins et al. |
| 5,215,545 | A | * | 6/1993 | Cates et al. ..... 8/490 |
| 5,275,627 | A | | 1/1994 | Cates et al. |
| 5,306,312 | A | | 4/1994 | Riggins et al. |
| 5,356,700 | A | | 10/1994 | Tanaka et al. |
| 5,447,540 | A | | 9/1995 | Kobayashi et al. |
| 5,456,728 | A | | 10/1995 | Schwarz et al. |
| 5,466,265 | A | | 11/1995 | Riegels et al. |
| 5,488,101 | A | | 1/1996 | Ogino et al. |
| 5,527,597 | A | * | 6/1996 | Stanhope et al. ..... 442/184 |
| 5,578,368 | A | | 11/1996 | Forsten et al. |
| 5,609,950 | A | | 3/1997 | Kampi et al. |
| 5,694,981 | A | | 12/1997 | Stanhope et al. |
| 5,776,746 | A | | 7/1998 | Denney, Jr. |
| 5,824,614 | A | | 10/1998 | Gadoury |
| 5,830,574 | A | | 11/1998 | Gadoury |
| 5,849,648 | A | | 12/1998 | Kent et al. |
| 5,885,307 | A | | 3/1999 | Gadoury |
| 5,891,813 | A | | 4/1999 | Gadoury |
| 6,132,476 | A | | 10/2000 | Lunsford et al. |
| 6,451,070 | B1 | | 9/2002 | Kent et al. |
| 6,547,835 | B1 | | 4/2003 | Lunsford et al. |
| 6,626,964 | B1 | | 9/2003 | Lunsford et al. |
| 6,818,024 | B2 | | 11/2004 | Lunsford et al. |
| 2003/0148689 | A1 | | 8/2003 | Lapierre |
| 2003/0167580 | A1 | | 9/2003 | Lunsford et al. |
| 2004/0029473 | A1 | | 2/2004 | McKee et al. |
| 2004/0045103 | A1 | | 3/2004 | Lunsford et al. |

FOREIGN PATENT DOCUMENTS

| | | | |
|---|---|---|---|
| JP | 50-90778 | | 7/1975 |
| JP | 58-87366 | | 5/1983 |
| JP | 58-87376 | * | 5/1983 |

* cited by examiner

*Primary Examiner*—Arti Singh-Pandey
(74) *Attorney, Agent, or Firm*—Kilpatrick Townsend & Stockton LLP

(57) ABSTRACT

The present disclosure relates to patterned, flame resistant fabrics and methods of making them. Generally speaking, the fabrics comprise a plurality of high tenacity, flame resistant fibers, and a plurality of cellulosic fibers containing a flame retardant compound, and at least one color which is printed on the fabric to form the pattern. In a preferred embodiment, the flame resistant fibers are para-aramid fibers and the cellulosic fibers are rayon fibers to yield a strong, flame resistant fabric.

59 Claims, No Drawings

PATTERNED, FLAME RESISTANT FABRICS AND METHOD FOR MAKING SAME

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of U.S. patent application Ser. No. 09/062,805, filed Apr. 20, 1998, now U.S. Pat. No. 6,132,476, and further claims the benefit of the filing date of U.S. Provisional Patent Application Ser. No. 60/149,792, filed Aug. 19, 1999. Both of these applications are hereby incorporated by reference into the present disclosure.

FIELD OF THE INVENTION

The present invention relates to patterned, flame resistant fabrics. More particularly, the present invention relates to flame resistant fabrics well suited for use in the construction of camouflage battle dress uniforms. In addition, the invention relates to methods for making such fabrics.

BACKGROUND OF THE INVENTION

Presently, U.S. infantry troops are issued camouflage patterned garments known as battle dress uniforms (BDUs). BDUs are used both in battle and during the execution of other tasks associated with military service. The BDUs in current use are either provided with a three or four color camouflage pattern that is printed directly onto the surface of the garment fabric. The nature of the pattern (e.g., color depth), as well as the particular physical construction of the fabric (e.g. fiber types), are dictated by to military specifications designated as MIL-C-44436(GL) and MIL-C-44031D. These specifications there developed after the creation and adoption of a material presently used by the military for all BDUs known as "Nyco." This material comprises 50/50) blend of nylon and cotton. Because the specifications were written based upon the Nyco material, many of the construction characteristics identified in MIL-C-44436(GL) and MIL-C-44031D specifically pertain to this material.

Although most military personnel are issued BDUs, troops involved in specialized areas of military service are often provided with flame resistant uniforms. For example, troops that work in close proximity to flammable liquids such as pilots, combat vehicle crewmen, and fuel handlers are outfitted with garments composed of meta-aramid fibers such as NOMEX$^R$ fibers, which are manufactured by DuPont of Wilmington, Del.

Recently, the federal government has expressed interest in providing flame resistant BDUs to military personnel. Although personnel could be issued BDUs constructed primarily of meta-aramid fibers to obtain the desired flame resistance, the costs of providing each person with such a garment would be extremely large. In addition, the tensile and tear strengths of such a fabric would likely fall far short of the requirements of MIL-C-44436(GL) and MIL-C-44031D. Although there are known fibers that have desirable flame resistance properties as well as high tensile and tear strengths, use of such fibers is generally not considered viable for BDU construction because it is difficult to form durable patterns on many of these fibers.

From the above, it can be appreciated that it is desirable to have a patterned, flame resistant fabric which would be a suitable substitute for existing BDU materials. Furthermore, it should be desirable to have a method for making such a fabric.

SUMMARY OF THE INVENTION

The present disclosure relates to patterned, flame resistant fabrics. Generally speaking, the fabrics comprise a plurality of high tenacity, flame resistant fibers, and a plurality of cellulosic fibers containing a flame retardant compound, and at least one color which is printed on the fabric to form the pattern. In a preferred embodiment, the flame resistant fibers are para-aramid fibers and the cellulosic fibers are rayon fibers.

DETAILED DESCRIPTION OF THE INVENTION

The present disclosure relates to flame resistant fabrics that are well suited for use to in the construction of military BDUs. Although the discussion that follows focuses on BDUs and U.S. military specifications MIL-C-44436(GL) and MIL-C44031D, it is to be understood that the fabrics described herein could be used in various other applications, if desired. In addition, it is to be understood that, for purposes of the present disclosure, fibers identified by a named material followed by the term "fiber" are not limited to fibers composed exclusively of the named material.

As identified above, MIL-C-44436(GL) and MIL-C-44031D contain many physical property requirements for materials used to construct BDUs. In view of the aforementioned difficulties in designing a flame resistant BDU, of particular concern is fabric durability as defined by tensile (i.e. breaking) strength and tear strength. Table I provides the class 1 requirements set by MIL-C-44436(GL), published Jul. 13, 1992, and MIL-C-44031D, published Dec. 4, 1985, and amended on Sep. 2, 1987, both of which are hereby incorporated by reference into the present disclosure.

TABLE I

| Fabric Property | Summer Weight (MIL-C-44436(GL)) | Winter Weight (MIL-C-44031D) |
|---|---|---|
| Breaking strength, (pounds) min. | | |
| Warp | 200 | 200 |
| Filling | 90 | 125 |
| Tearing strength, (pounds) min. | | |
| Warp | 7.0 | 11 |
| Filling | 5.0 | 8 |

In an effort to obtain substantial compliance with these strength requirements, the fabric of the present invention preferably comprises a plurality of high tenacity, flame resistant fibers. Preferred for the high tenacity, flame resistant fibers are non-producer colored para-aramid fibers. Such fibers are currently available under the trademarks KEVLAR$^R$, TECHNORA$^R$, and TWARON$^R$ from DuPont, Teijin, and Acordis, respectively. As is known in the art, para-aramid fibers are composed of aromatic polyamide. Although meta-aramid fibers are also composed of aromatic polyamide, para-aramid fibers are preferred over meta-aramid fibers because para-aramid fibers are considerably stronger.

To reduce manufacturing costs, improve wearer comfort, and improve the printability of patterns onto the material, the fabric of the present invention further preferably comprises a plurality of cellulosic fibers. Preferred for the choice of cellulosic fibers are rayon, acetate, triacetate, and lyocell. These cellulosics, although softer and less expensive than the high tenacity, flame resistant fibers, are not naturally resistant to flame. To increase the flame resistance of these fibers, one or more flame retardants are incorporated into the fibers during the manufacturing process. Effective flame retardants include phosphorus compounds and antimony compounds. Generally speaking, cellulosic fibers which contain one or more flame retardants are given the designation "FR" which indicates a flame resistant fiber. Accordingly, the preferred flame resistant cellulosic fibers are FR rayon, FR acetate, FR triacetate, and FR lyocell. Most preferably, the flame resistant cellulosic fibers are FR rayon fibers.

Typically, the blend has a percentage composition of para-aramid fibers of at least 10%, with the balance primarily comprising FR rayon fibers. Preferably, the percentage composition of the para-aramid fibers is between 10% and 60%, with approximately 40% being most preferred. Although the current military specifications require a 50/50 blend of nylon and cotton, the presently preferred blend of para-aramid and FR rayon fibers is believed to be an acceptable substitute in situations where thermal and/or flame resistance is desired. Due to this alternative construction, it will be appreciated that several of the physical construction requirements (e.g., yarn weight, yarns per inch) identified in MIL-C-44436(GL) and MIL-C-44031D might not be satisfied by fabric constructed in accordance with the present disclosure. However, these differences are deemed to be secondary in importance to providing a strong, flame resistant material.

In addition to the two primary fiber components identified above, the fabric can further comprise approximately 1% to 5% by percentage composition of an anti-static fiber. Although the provision of such an anti-static fiber is not considered necessary, it [2( )] may be desirable. When used, the anti-static fiber can comprise a fiber having a polyethylene-carbon core with a nylon sheath such as P140 manufactured by DuPont, or F7105C manufactured by BASF.

In keeping with MIL-C-4436(GL) and MIL-C-44031D, the fabric of the present invention preferably is arranged as a rip-stop for summer weight garments, and a twill weave for winter weight garments. By way of example, the fabric can comprise a plurality of blended yarns having warp cotton counts of 38/2 c.c. and fill cotton counts of 30/2 c.c. or 15/1 c.c., with the fabric having approximately 96 ends per inch (e.p.i.) and approximately 54 picks per inch (p.p.i.).

Tables II and III provide breaking strength and tearing strength data, respectively, for a prototype summer weight fabric constructed in accordance with the present disclosure. This fabric comprised a 60/37/3 blend of FR rayon, KEVLAR$^R$, and anti-static fibers. The blend was dyed a base shade and printed with four different colors to form the desired camouflage pattern. Although the breaking strengths identified in Table II are not as great as those presently required by MIC-4446(GL), these data suggest that breaking strength values in substantial compliance with the requirements are achievable.

TABLE II

| Breaking strength, (pounds) | |
|---|---|
| Warp | 160 |
| Filling | 100 |

With regard to tearing strength, the prototype fabric exceeded the current requirements of MIL-C-44436(GL) as indicated in Table III.

TABLE III

| Tearing strength, (pounds) | |
|---|---|
| Warp | 9.3 |
| Filling | 6.9 |

In addition to achieving substantial compliance with the strength requirements of the military specifications, of particular concern is satisfaction of the pattern requirements established for BDUs. Preferably, the camouflage patterns are applied to the BDU fabric by first dyeing the fabric a base shade and then dye printing over the base shade with the other colors of the pattern. As mentioned above, the difficulty in dyeing (and dye printing), high tenacity, flame resistant fabrics complicates satisfaction of the pattern requirements. The reasons for this difficulty are the same as those described in relation to fabric dyeing in related U.S. patent application Ser. No. 09/062,805, filed Apr. 20, 1998, now U.S. Pat. No. 6,132,476. As identified in that application, the flame retardants contained in FR cellulosics tend to be depleted by the relatively high temperatures generally considered necessary to affix dye within flame resistant fibers such as para-aramid fibers. The depletion of these flame retardants significantly reduces the flame resistance of the cellulosic fibers and therefore reduces the flame resistance of these blends.

The inventors have discovered that, contrary to conventional beliefs, high tenacity, flame resistant fibers such as para-aramid fibers can be dyed and/or dye printed at temperatures below 100° C. if particular dye-assistants are used during fabric processing. Dyeing and/or dye printing at these low temperatures avoids flame retardant depletion. It is this discovery that has led to the determination that a pattern, such as a camouflage pattern, can be formed on a flame resistant fabric by dyeing the high tenacity, flame resistant fibers and cellulosic fibers a light base shade at a temperature below 100° C. and then printing the remaining colors of the camouflage pattern onto the blend. Processing in this manner, a strong, flame resistant BDU can be produced which substantially satisfies the pattern requirements of the military specifications identified above.

The preferred dye-assistants for dyeing the high tenacity, flame resistant fibers of the blend are selected from the group consisting of N-cyclohexylpyrrolidone, benzyl alcohol, N,N-dibutylformamide, N,N-diethylbenzamide, hexadecyltrimethyl ammonium salt, N,N-dimethylbenzamide, N,N-diethyl-m-toluamide, N-octylpyrrolidone, aryl ether, Hacomid M-8/10 (an approximately 50/50 blend of N,N-dimethylcaprylamide and N,N-dimethylcapramide), and mixtures thereof. Most preferably, however, the dye-assistant is selected from the group consisting of aryl ether, benzyl alcohol, N,N-dibutyl formamide, N-octylpyrrolidone, and mixtures thereof.

To accomplish dyeing of the high tenacity, flame resistant fibers of the blend, a dye-assistant, a dye, and other additives if desired, typically are applied to the fabric using a one-step batch-type process. By way of example, basic, acid, or disperse dyes can be used to dye the high tenacity, flame resistant fibers. In one embodiment, a roll of fabric is loaded into a jet dyer such as a pressure jet dyeing vessel in which the fabric can be circulated through an apertured venturi contained within the vessel. The fabric first is scoured and then is dyed with the aid of the selected dye-assistant. The temperature of the dyebath normally is increased gradually from room temperature to a peak temperature below approximately 100° C. Preferably, the peak temperature is approximately 85° C. Upon reaching the predetermined peak temperature, the dyebath temperature is maintained to allow dye to penetrate the fibers.

In another embodiment, the fabric is beam dyed in conventional manner. Although jet and beam dyeing are preferred, it is to be understood that other known atmospheric dyeing methods may be equally advantageous. Irrespective of the particular dyeing method used, there is no need to pressurize the dyebath to prevent boiling since the dyeing temperature does not reach or exceed 100° C. Therefore, all dyeing can be conducted at atmospheric pressure. Optionally, the flame resistant cellulosic fibers can be dyed in similar manner. This dyeing can be conducted prior to, simultaneously with, or subsequent to dyeing of the high tenacity, flame resistant fibers. In that the cellulosic fibers normally readily accept dye, no dye-assistant is needed to dye the fibers. By way of example, direct or reactive dyes can be used to dye the cellulosic fibers.

Once the fabric has been dyed to the desired depth of shade (typically a light green or khaki for camouflage), if at all, the fibric is printed with conventional methods. By way of example, this printing can be accomplished with rotary screen printing apparatus. As will be appreciated by persons having ordinary skill in the art, printing can be achieved with dyes, pigments, or a combination of both. Where the fabric is to be dye printed, the aforementioned dye-assistants are useful in permitting the dye to penetrate the high tenacity, flame resistant fibers. In one embodiment, this dye-assistant can be added to the print paste. Alternatively, dye printing can be facilitated with dye-assistant contained within the fibers that has not been removed (e.g., if the fabric is not rinsed before printing). By way of example, basic, acid, or disperse dyes can be used to dye print the high tenacity, flame resistant fibers.

Where both the high tenacity, flame resistant fibers and the cellulosic fibers are to be dye printed, printing of the two fiber types can be accomplished simultaneously. Where dye printing of the individual high tenacity, flame resistant fibers is not desired or deemed necessary, dye-assistant is not needed. In such a case, the dye-based print paste may only penetrate the flame resistant cellulosic fibers. Suitable dyes for these fibers include direct, reactive, and vat dyes. Of these, vat dyes may be preferable in military applications due to their infrared spectral reflectance properties.

When the fabric is to be pigment printed only, dye-assistant is unnecessary in that the pigment is applied to the fabric as a surface coating instead of a fiber penetrating dye. Although such pigment printing is feasible, it is presently prohibited by the military specifications identified herein and therefore not presently preferred. As mentioned above however, because these specifications may change over time, an at least partially pigment printed fabric is presently contemplated.

Once printed, the fabric then can be finished in a conventional manner. This finishing process can include the application of wicking agents, water repellents, stiffening agents, softeners, and the like. Through these techniques, it is believed that full shades of color are achievable which substantially comply with the military BDU specifications.

While preferred embodiments of the invention have been disclosed in detail in the foregoing description and drawings, it will be understood by those skilled in the art that variations and modifications thereof can be made without departing from the scope of the invention as set forth in the following claims.

What is claimed is:

1. A patterned flame resistant fabric, comprising:

a plurality of non-producer colored high tenacity, flame resistant fibers;

a plurality of cellulosic fibers containing a flame retardant compound, the cellulosic fibers being blended with the high tenacity, flame resistant fibers; and at least one color that is printed on the fabric to form said pattern.

2. The fabric of claim 1, wherein said high tenacity, flame resistant fibers are para-aramid fibers.

3. The fabric of claim 1, wherein said cellulosic fibers are selected from rayon, acetate, triacetate, and lyocell.

4. The fabric of claim 1, wherein said cellulosic fibers are rayon fibers.

5. The fabric of claim 1, wherein said fabric has a percentage composition of high tenacity, flame resistant fibers of at least 10%.

6. The fabric of claim 1, wherein said fabric has a percentage composition of high tenacity, flame resistant fibers from approximately 10% to 60%.

7. The fabric of claim 1, wherein said fabric has a percentage composition of high tenacity, flame resistant fibers of approximately 40%.

8. The fabric of claim 1, wherein said fabric contains a residual amount of a dye-assistant selected from the group consisting of N-cyclohexylpyrrolidone, benzyl alcohol, N,N-dibutylformamide, N,N-diethylbenzamide, hexadecyltrimethyl ammonium salt, N,N-dimethylbenzamide, N,N-diethyl-m-toluamide, N-octylpyrrolidone, aryl ether, an approximately 50/50 blend of N,N-dimethylcaprylamide and N,N-dimethylcapramide, and mixtures thereof.

9. The fabric of claim 1, wherein said fabric contains a residual amount of a dye-assistant selected from the group consisting of aryl ether, benzyl alcohol, N,N-dibutyl formamide, N-octylpyrrolidone, and mixtures thereof.

10. The fabric of claim 1, wherein the fabric comprises a plurality of colors that are printed on the fabric to form said pattern.

11. The fabric of claim 10, wherein said pattern is a camouflage pattern.

12. The fabric of claim 10, wherein said non-producer colored high tenacity, flame resistant fibers and said cellulosic fibers are dyed a base shade of color.

13. A camouflaged-patterned flame resistant fabric, comprising:

a plurality of non-producer colored para-aramid fibers;

a plurality of cellulosic fibers containing a flame retardant compound, the cellulosic fibers being blended with the [high tenacity, flame resistant] *para-aramid* fibers; and a plurality of colors that are printed on the fabric to form a camouflage pattern.

14. The fabric of claim 13, wherein said cellulosic fibers are selected from rayon, acetate, triacetate, and lyocell.

15. The fabric of claim 13, wherein said cellulosic fibers are rayon fibers.

16. The fabric of claim 1, wherein said fabric has a percentage composition of high tenacity, flame resistant fibers from approximately 10% to 60%.

17. The fabric of claim 13, wherein said fabric contains a residual amount of a dye-assistant selected from the group consisting of aryl ether, benzyl alcohol, N,N-dibutyl formamide, N-octylpyrrolidone, and mixtures thereof.

18. The fabric of claim 13, wherein said non-producer colored para-aramid fibers and said cellulosic fibers are dyed a base shade of color.

19. A patterned flame resistant garment, comprising:

fabric that includes:

a plurality of non-producer colored high tenacity, flame resistant fibers;

a plurality of cellulosic fibers containing a flame retardant compound, the cellulosic fibers being blended with the high tenacity, flame resistant fibers; and at least one color that is printed on the fabric to form said pattern.

20. The garment of claim 19, wherein said high-tenacity, flame resistant fibers are para-aramid fibers.

21. The garment of claim 19, wherein said cellulosic fibers are selected from rayon, acetate, triacetate, and lyocell.

22. The garment of claim 19, wherein said cellulosic fibers are rayon fibers.

23. The garment of claim 19, wherein said fabric has a percentage composition of high tenacity, flame resistant fibers of at least 10%.

24. The garment of claim 19, wherein said fabric has a percentage composition of high tenacity, flame resistant fibers from approximately 10% to 60%.

25. The garment of claim 19, wherein said fabric has a percentage composition of high tenacity, flame resistant fibers of approximately 40%.

26. The garment of claim 19, wherein said fabric contains a residual amount of a dye-assistant selected from the group consisting of N-cyclohexylpyrrolidone, benzyl alcohol, N,N-dibutylformamide, N,N-diethylbenzamide, hexadecyltrimethyl ammonium salt, N,N-dimethylbenzamide, N,N-diethyl-m-toluamide, N-octylpyrrolidone, aryl ether, an approximately 50/50 blend of N,N-dimethylcaprylamide and N,N-dimethylcapramide, and mixtures thereof.

27. The garment of claim 19, wherein said fabric contains a residual amount of a dye-assistant selected from the group consisting of aryl ether, benzyl alcohol, N,N-dibutyl formamide, N-octylpyrrolidone, and mixtures thereof.

28. The garment of claim 20, wherein the garment is a component of a battle dress uniform (BDU).

*29. A patterned flame resistant fabric, comprising:*

*a plurality of high tenacity, flame resistant fibers;*

*a plurality of cellulosic fibers containing a flame retardant compound, the cellulosic fibers being blended with the high tenacity, flame resistant fibers; and*

*at least one color that is printed on the fabric to form said pattern.*

*30. The fabric of claim 29, wherein said high tenacity, flame resistant fibers are para-aramid fibers.*

*31. The fabric of claim 29, wherein said cellulosic fibers are selected from rayon, acetate, triacetate, and lyocell.*

*32. The fabric of claim 29, wherein said cellulosic fibers are rayon fibers.*

*33. The fabric of claim 29, wherein said fabric has a percentage composition of high tenacity, flame resistant fibers of at least 10%.*

*34. The fabric of claim 29, wherein said fabric has a percentage composition of high tenacity, flame resistant fibers from approximately 10% to 60%.*

*35. The fabric of claim 29, wherein said fabric has a percentage composition of high tenacity, flame resistant fibers of approximately 40%.*

*36. The fabric of claim 29, wherein said fabric contains a residual amount of a dye-assistant selected from the group consisting of N-cyclohexylpyrrolidone, benzyl alcohol, N,N-dibutylformamide, N,N-diethylbenzamide, hexadecyltrimethyl ammonium salt, N,N-dimethylbenzamide, N,N-diethyl-m-toluamide, N-octylpyrrolidone, aryl ether, an approximately 50/50 blend of N,N-dimethylcaprylamide and N,N-dimethylcapramide, and mixtures thereof.*

*37. The fabric of claim 29, wherein said fabric contains a residual amount of a dye-assistant selected from the group consisting of aryl ether, benzyl alcohol, N,N-dibutyl formamide, N-octylpyrrolidone, and mixtures thereof.*

*38. The fabric of claim 29, wherein the fabric comprises a plurality of colors that are printed on the fabric to form said pattern.*

*39. The fabric of claim 38, wherein said pattern is a camouflage pattern.*

*40. The fabric of claim 38, wherein said high tenacity, flame resistant fibers and said cellulosic fibers are dyed a base shade of color.*

*41. A camouflaged-patterned flame resistant fabric, comprising:*

*a plurality of para-aramid fibers;*

*a plurality of cellulosic fibers containing a flame retardant compound, the cellulosic fibers being blended with the para-aramid fibers; and*

*a plurality of colors that are printed on the fabric to form a camouflage pattern.*

*42. The fabric of claim 41, wherein said cellulosic fibers are selected from rayon, acetate, triacetate, and lyocell.*

*43. The fabric of claim 41, wherein said cellulosic fibers are rayon fibers.*

*44. The fabric of claim 29, wherein said fabric has a percentage composition of high tenacity, flame resistant fibers from approximately 10% to 60%.*

*45. The fabric of claim 41, wherein said fabric contains a residual amount of a dye-assistant selected from the group consisting of aryl ether, benzyl alcohol, N,N-dibutyl formamide, N-octylpyrrolidone, and mixtures thereof.*

*46. The fabric of claim 41, wherein said para-aramid fibers and said cellulosic fibers are dyed a base shade of color.*

*47. A patterned flame resistant garment, comprising:*

*fabric that includes:*

*a plurality of high tenacity, flame resistant fibers;*

*a plurality of cellulosic fibers containing a flame retardant compound, the cellulosic fibers being blended with the high tenacity, flame resistant fibers; and*

*at least one color that is printed on the fabric to form said pattern.*

*48. The garment of claim 47, wherein said high-tenacity, flame resistant fibers are para-aramid fibers.*

*49. The garment of claim 47, wherein said cellulosic fibers are selected from rayon, acetate, triacetate, and lyocell.*

*50. The garment of claim 47, wherein said cellulosic fibers are rayon fibers.*

*51. The garment of claim 47, wherein said fabric has a percentage composition of high tenacity, flame resistant fibers of at least 10%.*

*52. The garment of claim 47, wherein said fabric has a percentage composition of high tenacity, flame resistant fibers from approximately 10% to 60%.*

*53. The garment of claim 47, wherein said fabric has a percentage composition of high tenacity, flame resistant fibers of approximately 40%.*

*54. The garment of claim 47, wherein said fabric contains a residual amount of a dye-assistant selected from the group consisting of N-cyclohexylpyrrolidone, benzyl alcohol, N,N-dibutylformamide, N,N-diethylbenzamide, hexadecyltrimethyl ammonium salt, N,N-dimethylbenzamide, N,N-diethyl-m-toluamide, N-octylpyrrolidone, aryl ether, an approximately 50/50 blend of N,N-dimethylcaprylamide and N,N-dimethylcapramide, and mixtures thereof.*

*55. The garment of claim 47, wherein said fabric contains a residual amount of a dye-assistant selected from the group consisting of aryl ether, benzyl alcohol, N,N-dibutyl formamide, N-octylpyrrolidone, and mixtures thereof.*

*56. The garment of claim 48, wherein the garment is a component of a battle dress uniform (BDU).*

*57. A patterned flame resistant fabric comprising:*

*a plurality of high tenacity, flame resistant fibers;*

*a plurality of cellulosic fibers comprising a flame retardant compound, the cellulosic fibers being blended with the high tenacity, flame resistant fibers; and*

*at least one color that is dye printed on the fabric to form the pattern.*

*58. A patterned flame resistant garment comprising the fabric of claim 57.*

*59. A camouflaged-patterned flame resistant fabric comprising:*

*a plurality of para-aramid fibers;*

*a plurality of cellulosic fibers comprising a flame retardant compound, the cellulosic fibers being blended with the para-aramid fibers; and*

*a plurality of colors that are dye printed on the fabric to form a camouflage pattern.*

* * * * *